United States Patent
Pelissier et al.

(10) Patent No.: US 9,918,310 B2
(45) Date of Patent: Mar. 13, 2018

(54) VERSATILE RADIO RECEIVER ARCHITECTURE

(71) Applicants: Commissariat à l'Energie Atomique et aux Energies Alternatives, Paris (FR); AIRBUS DS SAS, Elancourt (FR)

(72) Inventors: Michaël Pelissier, Grenoble (FR); Patrick Audebert, Varces-Allieres-et-Risset (FR); Luis Lolis, Curitiba (BR)

(73) Assignees: COMMISSARIAT À L'ENERGIE ATOMIQUE ET AUX ENERGIES ALTERNATIVES, Paris (FR); AIRBUS DS SAS, Elancourt (FR)

( * ) Notice: Subject to any disclaimer, the term of this patent is extended or adjusted under 35 U.S.C. 154(b) by 0 days.

(21) Appl. No.: 15/165,864

(22) Filed: May 26, 2016

(65) Prior Publication Data

US 2016/0381669 A1 Dec. 29, 2016

(30) Foreign Application Priority Data

May 26, 2015 (FR) ..................... 15 54720

(51) Int. Cl.
| | |
|---|---|
| H04B 1/10 | (2006.01) |
| H04B 1/16 | (2006.01) |
| H04W 72/04 | (2009.01) |
| H04B 1/00 | (2006.01) |
| H04B 1/18 | (2006.01) |
| H04L 5/00 | (2006.01) |

(52) U.S. Cl.
CPC ........ *H04W 72/044* (2013.01); *H04B 1/0003* (2013.01); *H04B 1/16* (2013.01); *H04B 1/18* (2013.01); *H04L 5/0078* (2013.01)

(58) Field of Classification Search
CPC ...... H04B 1/001; H04B 1/0025; H04B 1/006; H03H 15/00; H03H 15/02
(Continued)

(56) References Cited

U.S. PATENT DOCUMENTS

| | | | |
|---|---|---|---|
| 7,529,322 B2 | 5/2009 | Mak et al. | |
| 8,325,865 B1 * | 12/2012 | Rofougaran | H04B 1/001 |
| | | | 375/316 |

(Continued)

FOREIGN PATENT DOCUMENTS

WO 2011073357 A1 6/2011

OTHER PUBLICATIONS

Preliminary Search Report in French Patent Application No. 1554720, dated Mar. 18, 2016, 3 pages.

(Continued)

*Primary Examiner* — Simon Nguyen
(74) *Attorney, Agent, or Firm* — Moreno IP Law LLC (57) ABSTRACT

An RF receiver comprises a down-converting and sampling circuit (104) adapted to: receive an RF input signal ($RF_{IN}$) having a signal band ($BW_{RF}$) comprising a plurality of sub-bands ($BW_{IF}$), each sub-band comprising a plurality (2K) of channels separated by frequency channel spaces ($\Delta f_{CH}$); and perform frequency transposition and sampling to generate a discrete time signal in which a selected one of the plurality of sub-bands is brought from an initial frequency band to a lower frequency band ($IF2_0 \pm K\Delta f_{CH}$); and a discrete time filter (108) having a variable pass band, the central frequency ($f_0$) of the discrete time filter being controllable to select any one of the plurality (2K) of channels of the selected sub-band.

16 Claims, 4 Drawing Sheets

(58) Field of Classification Search
USPC .................................................. 455/307, 339
See application file for complete search history.

(56) References Cited

U.S. PATENT DOCUMENTS

| | | | | |
|---|---|---|---|---|
| 8,705,675 | B2* | 4/2014 | Lolis | H04B 1/0025 324/76.41 |
| 9,154,344 | B2* | 10/2015 | Huang | H04L 25/08 |
| 2006/0195883 | A1* | 8/2006 | Proctor, Jr. | H03H 15/00 725/127 |
| 2007/0001754 | A1* | 1/2007 | Lakdawala | H03H 15/00 327/552 |
| 2007/0259620 | A1 | 11/2007 | Joet et al. | |
| 2009/0002066 | A1* | 1/2009 | Lee | H03H 15/02 327/554 |
| 2010/0093301 | A1 | 4/2010 | Lee | |
| 2010/0167685 | A1* | 7/2010 | Burke | H04B 1/28 455/341 |
| 2010/0316174 | A1* | 12/2010 | Lee | H03H 15/023 375/345 |
| 2014/0169501 | A1* | 6/2014 | Nazarathy | H03H 17/0266 375/316 |
| 2014/0194081 | A1* | 7/2014 | Tohidian | H04B 1/26 455/258 |

OTHER PUBLICATIONS

Latiri, Anis, et al., "A reconfigurable RF sampling receiver for multistandard applications", Comptes Rendus-Physique, Elsevier, Paris, France, vol. 7, No. 7, Sep. 1, 2006, 10 pages.

Mak, Pui-In, et al., "Two-Step Channel Selection—A Novel Technique for Reconfigurable Multistandard Transceiver Front-Ends", IEEE Transactions on Circuits and Systems—1: Regular Papers, vol. 52, No. 7, Jul. 2005, 14 pages.

Fleischer, P.E., et al., "A Family of Active Switched Capacitor Biquad Building Blocks", The Bell System Technical Journal, vol. 58, No. 10, Dec. 1979, 35 pages.

Karvonen, Sami, et al., "A Quadrature Charge-Domain Sampler With Embedded FIR and IIR Filtering Functions", IEEE Journal of Solid-State Circuits, vol. 4, No. 2, Feb. 2006, 9 pages.

Ki, Wing-Hung, et al., "Offset-Compensated Switched-Capacitor Integrators", IEEE International Symposium on Circuits and Systems, 1990, pp. 2829-2832.

Ki, Wing-Hung, et al., "Optimal Capacitance Assignment of Switched-Capacitor Biquads", IEEE Transactions on Circuits and Systems-I: Fundamental Theory and Applications, vol. 42, No. 6, Jun. 1995, p. 334.

Muhammad, K., et al., "A Discrete Time Quad-band GSM/GPRS Receiver in a 90nm Digital CMOS Process", IEEE 2005 Custom Integrated Circuits Conference, 2005, pp. 809-812.

Pavlovic, Nenad, et al., "A 5.3GHz Digital-to-Time-Converter-Based Fractional-N All-Digital PLL", ISSCC 2011, pp. 54-56.

Rudell, Jacques, et al.. "A 1.9-GHz Wide-Band IF Double Conversion CMOS Receiver for Cordless Telephone Applications", IEEE Journal of Solid-State Circuits, vol. 32, No. 12, Dec. 1997, pp. 2071-2088.

Gregorian, Roubik, et al., "Analog MOS integrated circuits for signal processing", Section 5.4: Second-Order Sections; Cascade Filter Design, Wiley, 1986, pp. 280-297.

Razavi B., "Architecture and Circuits for RF CMOS Receivers", Proceedings in Customer Integrated Circuits Conference (CICC), May 1998, pp. 393-400.

Razavi, B., "Design Considerations for Direct-Conversion Receivers", IEEE Transactions on Circuits and Systems-II: Analog and Digital Signal Processing. vol. 44, No. 6. Jun. 1997, pp. 428-435.

* cited by examiner

VERSATILE RADIO RECEIVER ARCHITECTURE

FIELD

The present disclosure relates to the field of radio frequency (RF) receivers, and in particular to an RF receiver capable of selecting a channel from a plurality of sub-bands.

BACKGROUND

Mobile handsets today are often required to address multiple RF standards, such as 2G (second generation), 3G, 4G, GPS (global positioning system), WiFi (wireless fidelity), Bluetooth, etc. In order to keep manufacturing and test costs as low as possible, the number of discrete devices used to implement an RF receiver for a given standard has shrunk from several hundreds to just a few tens. There is also a move towards fully-integrated solutions.

A classical solution is to use a super-heterodyne architecture to down-convert the RF signal to a given intermediate frequency (IF). The RF channel selection in architectures of this type could be performed using one of two different approaches.

One approach would be to use an RF clock synthesizer to down-convert the signal to the given IF, and use an external off-chip VCO (voltage controlled oscillator) component, so as to provide a local oscillator for mixing the signal and performing down conversion. In addition, it is typical to use a quartz filter, centered at the IF, to filter out any interferers. The main limitation of this solution is that a high phase noise requirement prevents the integration of VCO itself. Furthermore, the lack of re-configurability of the off-chip component prevents several standards having different channel bandwidths from being addressed with a single component.

An alternative approach would be to use a fixed frequency synthesizer to perform the down-conversion, and performing the filtering using a versatile filter. However, reconfigurability of the central frequency is practically impossible to achieve in such a case, and the constraint in terms of bandwidth is extremely high.

The publication by Pui-In Mak et al. entitled "Two-step Channel Selection—A Novel Technique for Reconfigurable Multistandard Transceiver Front-Ends", IEEE Transactions on Circuits and Systems-I: Regular papers, Vol. 52, No. 7, July 2005, proposes a partition of the channel selection process between RF and IF analog front-ends, such that only a coarse selection is necessary at the RF, and a fine selection is completed at the IF.

However, while the solution described by Mak et al. provides a good trade-off between the two previously described solutions, it has drawbacks in terms of the accuracy of the frequency selection, and the quality factor that can be achieved.

There is thus a need for an alternative receiver architecture providing channel selection with improved precision and a higher quality factor with respect to existing solutions, and for a solution permitting reconfigurability for multistandard operation.

SUMMARY

It is an aim of embodiments of the present description to at least partially address one or more needs in the prior art.

According to one aspect, there is provided an RF receiver comprising: a down-converting and sampling circuit adapted to: receive an RF input signal having a signal band comprising a plurality of sub-bands, each sub-band comprising a plurality of channels separated by frequency channel spaces; perform frequency transposition and sampling to generate a discrete time signal in which a selected one of the plurality of sub-bands is brought from an initial frequency band to a lower frequency band; and a discrete time filter having a variable pass band, the central frequency ($f_0$) of the discrete time filter being controllable to select any one of the plurality of channels of the selected sub-band.

According to one embodiment, the discrete time filter is controllable to select a first channel of the selected sub-band by bringing the central frequency of the discrete time filter to a frequency of the first channel.

According to one embodiment, the down-converting and sampling circuit comprises: a first transposition circuit adapted to transpose the selected sub-band from the initial frequency band to an intermediate frequency band based on a first frequency signal; a frequency signal generation circuit adapted to generate the first frequency signal based on an initial frequency signal generated as a function of the sub-band to be selected; and a second transposition circuit adapted to transpose the selected sub-band from the intermediate frequency band to the lower frequency band.

According to one embodiment, the first transposition circuit comprises a mixer adapted to mix the RF input signal with the first frequency signal to generate an intermediate signal; the down-converting and sampling circuit comprises a sampling circuit driven by a second frequency signal to sample the intermediate signal and to generate an intermediate discrete time signal; and the second frequency signal is generated by the frequency signal generation circuit based on the initial frequency signal.

According to one embodiment, the frequency signal generation circuit is adapted to generate the second frequency signal by dividing the initial frequency signal by an integer.

According to one embodiment, the second transposition circuit comprises: a decimator adapted to decimate the signal at the central frequency of the intermediate frequency band and transpose the intermediate frequency band to the lower frequency band, wherein decimation decreases the sampling rate to $f_d=f_s/M_d$, where $f_s$ is the frequency of the second frequency signal, and $M_d$ is the decimation order of the decimator equal to an odd integer of 3 or more; and an anti-aliasing filter adapted to perform anti-aliasing filtering prior to the decimation, wherein the anti-aliasing filter is adapted to have a pass band of a bandwidth equal to or greater than the combined bandwidth of the plurality of channels.

According to one embodiment, the anti-aliasing filter comprises: an IIR filter stage adapted to receive the selected sub-band at the intermediate frequency band; and an FIR filter coupled to an output of the IIR filter.

According to one embodiment, the anti-aliasing filter is configured to have: a central frequency at $f_s/4$, where $f_s$ is the frequency of the second frequency signal; a pass bandwidth equal to or greater than the bandwidth of the selected sub-band; and rejection band characteristics rejecting the signal at $IF1_0+m*f_d$, where $IF1_0$ is the central frequency of the anti-aliasing filter, m is an integer equal or greater than 1, and $f_d$ is equal to the frequency $f_s/M_d$.

According to one embodiment, the frequency signal generation circuit comprises a phase locked loop having a feedback path comprising a division circuit adapted to divide the initial frequency signal by an integer N, wherein the value of N is adjusted based on the sub-band to be selected.

According to one embodiment, the discrete time filter is an IIR discrete time processing filter having a transfer function Hc(z) based on the equation:

$$H_C(z) = Gv \frac{(1-\beta)}{1-(\alpha+j\gamma)\cdot z^{-1}}$$

where Gv is a voltage gain of the filter, and $\alpha$, $\beta$ and $\gamma$ are coefficients, and wherein the coefficients $\alpha$ and $\gamma$ are variable and selected such that $\alpha+\gamma>1$.

According to one embodiment, the coefficient $\beta$ is adjustable in order to control the bandwidth of the discrete time filter.

According to one embodiment, the discrete time filter comprises a plurality of switched capacitors of which at least one has a capacitance variable in order to select one of the plurality of channels of the selected sub-band.

According to one embodiment, the discrete time filter is adapted to have a passband bandwidth variable between a plurality of values, the plurality of switched capacitors further comprises at least one capacitor adapted to have a variable capacitance for selecting one of the plurality of passband bandwidths.

According to one embodiment, the discrete time filter comprises: a first operational trans-impedance amplifier having a first input coupled via a first switched capacitor to a first input for receiving a first signal component from the down-converting and sampling circuit; and a second operational trans-impedance amplifier having a second input coupled via a second switched capacitor to a second input for receiving a second signal component from the down-converting and sampling circuit.

According to one embodiment, the discrete time filter further comprises: a third capacitor coupled between the input and an output of the first operational trans-impedance amplifier; a fourth switched capacitor coupled between the input and the output of the first operational trans-impedance amplifier; a fifth capacitor coupled between the input and an output of the second operational trans-impedance amplifier; a sixth switched capacitor coupled between the input and the output of the second operational trans-impedance amplifier; a seventh switched capacitor coupled between the input of the first operational trans-impedance amplifier and the output of the second operational trans-impedance amplifier; an eighth switched capacitor coupled between the output of first operational trans-impedance amplifier and the input of the second operational trans-impedance amplifier; and a control circuit for generating selection signals for controlling the capacitance of at least one of the second, third, fourth, fifth, sixth, seventh and eighth capacitors based on the channel to be selected.

According to a further aspect, there is provided a method of RF reception comprising: receiving by an RF receiver an RF input signal having a signal band comprising a plurality of sub-bands, each sub-band comprising a plurality of channels separated by frequency channel spaces; performing frequency transposition and sampling to generate a discrete time signal in which a selected one of the plurality of sub-bands is brought from an initial frequency band to a lower frequency band; and controlling a central frequency ($f_0$) of a discrete time filter to select any one of the plurality of channels of the selected sub-band.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Throughout the present disclosure, the term "connected" is used to designate a direct electrical connection between components, whereas the term "coupled" is used to designate an electrical connection that may be direct, or may be via one or more intermediate components, such as resistors, capacitors or transistors. The term "approximately" is used to designate a range of plus or minus 10 percent of the value in question.

Figure 1:
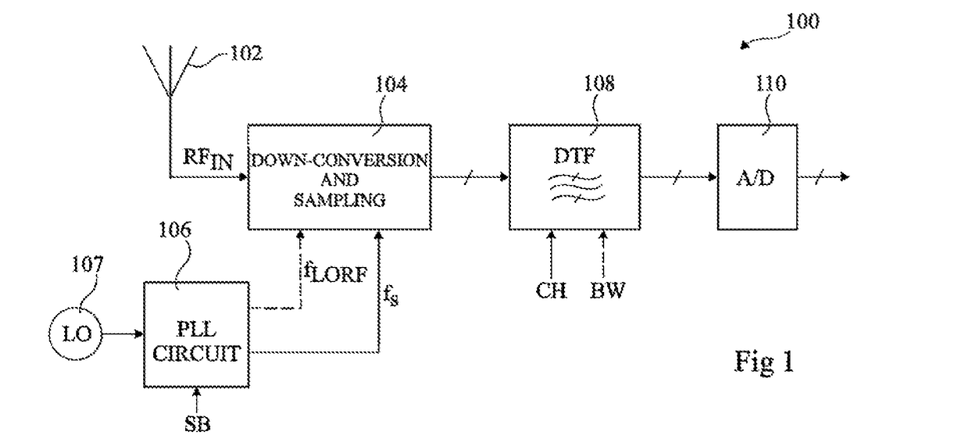
FIG. 1 schematically illustrates an RF receiver according to an example embodiment of the present disclosure.

FIG. 1 schematically illustrates an RF receiver 100 according to an example embodiment.

The receiver 100 comprises an RF antenna 102 for receiving a radio frequency input signal RFIN. The RF receiver 100 is for example capable of receiving and demodulating a channel selected from one of a plurality of sub-bands. In particular, as will be described in more detail below, the RF signal $RF_{IN}$ for example comprises a signal band $BW_{RF}$ comprising a plurality of sub-bands $BW_{IF}$, each sub-band comprising 2K channels, where K is an integer equal or greater than 1. Calling the frequency spacing between each channel $\Delta f_{CH}$, each sub-band $BW_{IF}$ thus for example has a bandwidth of $2K\Delta f_{CH}$.

The antenna 102 is coupled to a down-converting and sampling circuit (DOWN-CONVERTING AND SAMPLING) 104. The circuit 104 for example performs frequency transposition on the RF input signal in order to bring a selected one of the sub-bands from its initial frequency band down to a lower frequency band equal to $IF2_0 \pm K\Delta f_{CH}$, where $IF2_0$ is a central frequency of the lower frequency band. The central frequency $IF2_0$ for example remains at approximately the same frequency irrespective of which of the sub-bands is selected.

The down-converting and sampling circuit 104 also for example performs sampling at a sampling frequency fs in order to generate a discrete time signal. The sampling frequency $f_s$ is for example generated by a phase-locked loop circuit (PLL CIRCUIT) 106 based on a frequency signal generated by a local oscillator (LO) 107, which is for example a VCO or the like. As represented by a dashed arrow in FIG. 1, in some embodiments the PLL circuit 106 also generates a frequency signal $f_{LORF}$ used by the circuit 104 for down-converting a selected sub-band of the RF signal, for example using a mixer (not illustrated in FIG. 1).

The down-conversion applied to the RF signal $RF_{IN}$ is for example variable based on the sub-band to be selected. This variation is for example achieved by varying the frequency of the signal $f_s$ and/or of the signal $f_{LORF}$ provided by the phase-locked loop 106. In particular, the circuit 106 for example receives a control signal SB indicating a sub-band to be selected, and the PLL circuit 106 generates the frequency of the signal $f_s$ and/or $f_{LORF}$ as a function of the control signal SB. The variation in the frequency signal $f_s$ and/or $f_{LORF}$ is for example performed in coarse steps. Indeed, the step size between frequency levels should permit the selection of a sub-band comprising a plurality 2K of channels, rather than any single channel. This relaxation in precision with respect to the case in which channel selection is performed on the PLL side for example permits at least part of the PLL circuit 106, such as its voltage controlled oscillator (not illustrated in FIG. 1) to be integrated on chip.

The output of the down-converting and sampling circuit 104 is coupled to a discrete time filter (DTF) 108, which for example has a pass band that is slid based on a channel selection signal CH. The central frequency $f_0$ of the filter 108 can be controlled to select one of the 2K channels of a selected sub-band. In particular, the central frequency f0 of the filter 108 is tuned to a desired kth channel of the 2K channels forming the selected sub-band so as to perform channel selection and filter out interferers. In some embodiments, the bandwidth of the filter 108 is also capable of being adjusted in order to cover multi-standard applications. Therefore, as represented by a dashed arrow in FIG. 1, the DTF 108 also for example receives a bandwidth selection signal BW, and is adapted to vary the bandwidth of its pass band as a function of this signal.

The DTF 108 is for example an IIR (infinite impulse response) filter, for example implemented by a switched capacitor circuit comprising one or more variable capacitors for adjusting the central frequency and bandwidth of the DTF. In some embodiments described in more detail below, the DTF 108 is a biquad discrete time circuit comprising two OTAs (Operational Trans-impedance Amplifiers—not illustrated in FIG. 1).

The output of the DTF 108 is for example coupled to an analog to digital converter 110, which converts the analog discrete time signal into a digital signal. The digital signal is for example demodulated by digital processing circuits well known to those skilled in the art and not illustrated in the figures. For example, such digital processing circuits may comprise one or more of a variable integer decimation circuit, a variable base-band channel filter and a variable interpolation/non integer decimation circuit.

Figure 2:
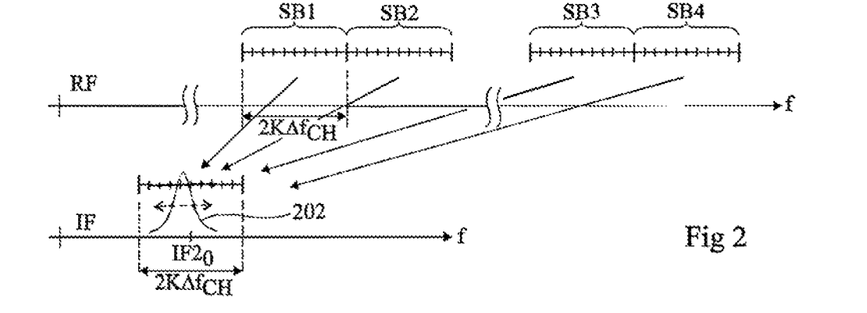
FIG. 2 shows frequency graphs representing channel selection by the RF receiver of FIG. 1 according to an example embodiment.

FIG. 2 shows frequency graphs representing channel selection by the RF receiver 100 of FIG. 1. As illustrated, in one example, the RF signal comprises neighboring sub-bands SB1 and SB2, which for example correspond to one communications standard, and neighboring sub-bands SB3 and SB4. Each sub-band for example comprises 2K channels, although in alternative embodiments one or more of the sub-bands could have a different number of channels from the others. In such a case, the bandwidth $BW_{IF}$ is equal to the bandwidth of the largest sub-band. In the example of FIG. 2, each sub-band comprises 10 channels, i.e. K is equal to 5. In alternative embodiments, K is equal to at least 10, and is for example equal to approximately 50. Each channel is for example spaced by a frequency spacing $\Delta f_{CH}$ of between 1 and 50 kHz, for example of around 10 KHz.

A selected one of the sub-bands is transposed to the frequency band $IF2_0 \pm K\Delta f_{CH}$. For example, each of the sub-bands SB1 to SB4 are centered on RF frequencies falling in the range 400 MHz to 3 GHz. In one example, the sub-bands SB1 and SB2 are centered on frequencies of approximately 400 MHz and the sub-bands SB3 and SB4 are centered on frequencies of approximately 800 MHz, although many other frequencies would be possible. The central frequency $IF2_0$ of the lower frequency band is for example in the range of 1 MHz to 10 MHz, and in one embodiment is equal to approximately 5 MHz.

A curve 202 in FIG. 2 represents the transfer function of the discrete time filter 108 of FIG. 1, which is discussed in more detail below in relation to FIG. 10. The central frequency of this filter is slid in order to select one of the 2K channels of the selected sub-band, and in some cases the bandwidth of the filter is adjusted.

Figure 3A:
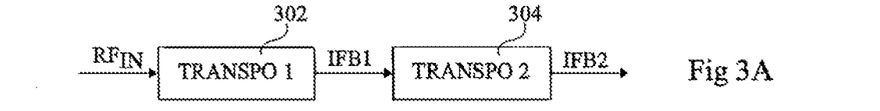
FIG. 3A schematically illustrates a down-converting and sampling circuit of the RF receiver of FIG. 1 in more detail according to an example embodiment.

FIG. 3A illustrates the down-converting and sampling circuit 104 of FIG. 1 in more detail according to one example according to which it comprises a plurality of transposition circuits for progressively bringing a selected sub-band from its initial frequency band to the lower frequency band. For example, the circuit 104 comprises a transposition circuit (TRANSPO1) 302 for bringing the sub-band down to an intermediate frequency band $IF1 = IF1_0 \pm K\Delta f_{CH}$, where $IF1_0$ is a central frequency of the intermediate frequency band, and a transposition circuit (TRANSPO2) 304 for bringing the intermediate frequency band down to the lower frequency band $IF2 = IF2_0 \pm K\Delta f_{CH}$. Sampling is for example performed within either or both of the transposition circuits 302, 304, as will now be described with reference to FIGS. 3B to 3D.

Figure 3B:
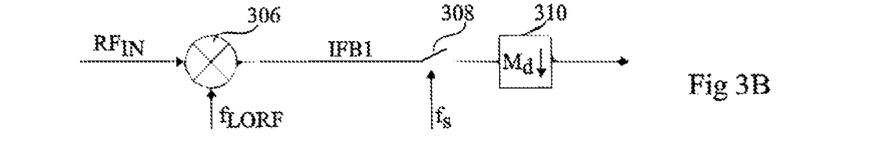
FIGS. 3B, 3C and 3D schematically illustrate example implementations of the circuit of FIG. 3A.
Figure 3C:
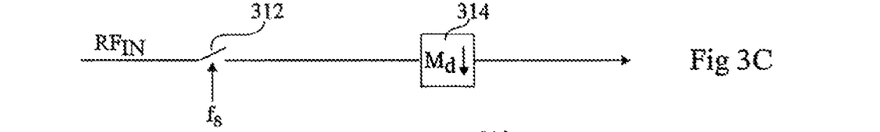
Figure 3D:
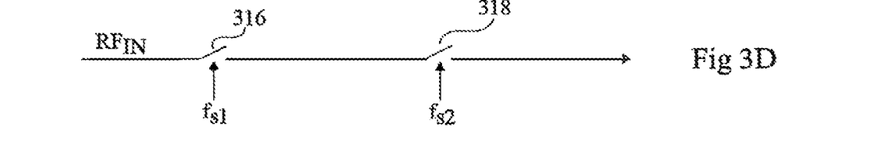

FIGS. 3B to 3D schematically illustrate example embodiments of the transposition circuits 302 and 304. Only the principal transposition functions of these circuits are illustrated, and those skilled in the art will be capable of selecting appropriate filters for implementing these circuits.

As illustrated in FIG. 3B, in one embodiment the transposition circuit 302 comprises a mixer 306, which mixes the input signal $RF_{IN}$ with a frequency signal $f_{LORF}$ generated based on a signal $f_{LO}$ from the reference oscillator 107 to generate the signal at the intermediate band IF1. The transposition circuit 304 comprises a sampling circuit 308 for sampling the signal at a frequency $f_s$, equal for example to approximately four times the central frequency of the intermediate band signal IF1, and a decimator 310 for reducing the number of samples by a factor $M_d$, and thus down-converting the intermediate frequency band IF1 to the lower frequency band IF2.

As illustrated in FIG. 3C, in another embodiment the transposition circuit 302 comprises a sampling circuit 312, which under-samples the input signal $RF_{IN}$. Thus the sampling frequency $f_s$ in this case is equal, for example, to less than the central frequency far of the selected sub-band. The sampling operation thereby generates the signal at the intermediate frequency band IF1. The transposition circuit 304 comprises a decimator 314 for reducing the number of samples by a factor $M_d$, and thus down-converting the intermediate frequency band IF1 to the lower frequency band IF2.

As illustrated in FIG. 3D, in another embodiment, the transposition circuit 302 comprises a sampling circuit 316, which under-samples the input signal $RF_{IN}$. Thus the sampling frequency $f_{s1}$ is in this case equal, for example, to less than the central frequency $f_{RF}$ of the selected sub-band. The sampling operation thereby generates the signal at the intermediate band IF1. The transposition circuit 304 comprises a further sampling circuit 318, which for example under-samples the signal at the intermediate frequency band IF1 by applying a sampling frequency $f_{s2}$. The sampling frequency $f_{s2}$ is for example equal to less than the central frequency $IF1_0$ of the intermediate frequency band IF1. The intermediate frequency band IF1 is thus down-converted to the lower frequency band IF2.

In alternative embodiments, features of the embodiments of FIG. 3B to 3D could be combined in different combinations. For example, the sampling circuit 308 and decimator 310 of FIG. 3B could be replaced by the under-sampling circuit 318.

As a further example, the mixer 306 of FIG. 3B, or the sampling circuits 312 or 316 of FIGS. 3C and 3D, could be replaced by discrete time and band pass sampling circuits performing down-conversion based on the relationship $f_{RF-0}=(L+\zeta)\times f_s$, where $f_{RF-0}$ is the RF central frequency of the sub-band to be selected and down-converted, $f_s$ is the sampling frequency, L is the harmonic used to achieve the down conversion, and $\zeta=0$, ½, ¼, is ratio indicating where filter of the intermediate frequency band IF1 is to be centered, respectively at $f_s$, $f_s/2$ or $f_s/4$.

Figure 4:
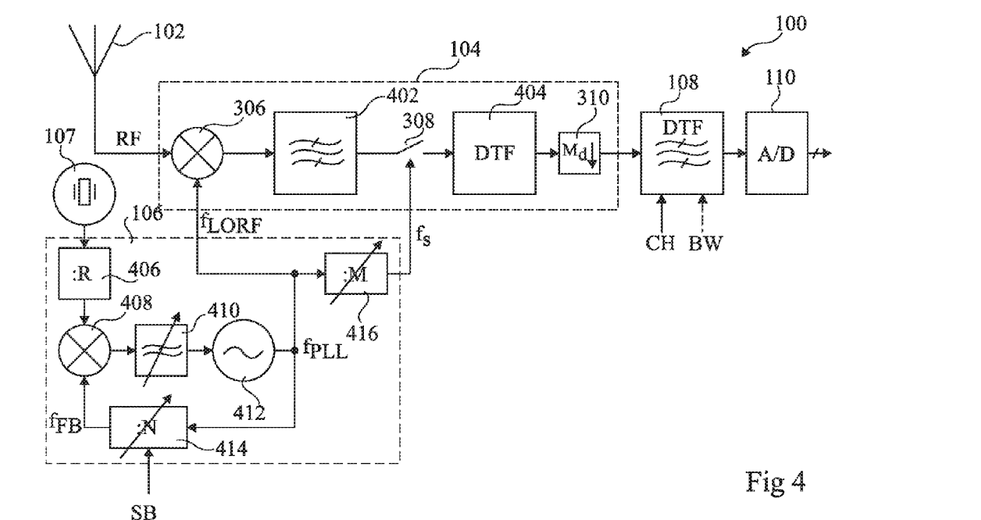
FIG. 4 schematically illustrates the RF receiver of FIG. 1 in more detail according to an example embodiment of the present disclosure.

FIG. 4 illustrates the RF receiver 100 of FIG. 1 in more detail in the case that the down-converting and sampling circuit 104 is implemented according to the embodiment of FIG. 3B.

An anti-aliasing filter 402 is for example provided between the mixer 306 and the sampling circuit 308. This filter 402 is for example an analog bandpass filter or it could be directly embedded in a current sampling. It provides anti-aliasing filtering at the frequency $N \cdot f_s$, as well as filtering of the image signal $IMG_{IF1}$. This filter for example has a pass band centered at the frequency $IF1_0$, and a bandwidth of approximately 20 MHz.

Furthermore, a discrete time filter (DTF) 404 is for example provided before the decimator 310, and provides anti-aliasing filtering for the decimation operation as well as IF1 image rejection in view of the lower frequency band IF2. This image is positioned at $-IF1_0+2IF2_0$. Furthermore, the bandwidth $BW_{IF1}$ of this filter is adapted to cover the whole frequency range of the selected sub-band, in other words the frequency range $2K\Delta f_{CH}$, so as not to filter out the signal itself. Typically, $BW_{IF1}>2K\Delta f_{CH}$. The DTF 404 is for example implemented by one or more IIR (infinite impulse response) filters and/or one or more FIR (finite impulse response) filters depending on the aliasing rejection level requirement.

While not illustrated in FIG. 4, in some embodiments one or more further decimation and anti-aliasing stages could be added in order to further reduce the frequency $f_{ADC}$ at which the analog to digital converter 110 is running.

The reference oscillator 107 is implemented by a quartz oscillator in the example of FIG. 4, although in alternative embodiments different types of oscillators could be used.

The phase locked loop 106 for example comprises a divider 406 for dividing the frequency signal generated by the oscillator 107 by a factor R. The divided signal is provided to a mixer 408 for mixing it with a feedback frequency signal $f_{FB}$. The output of the mixer 408 is coupled, for example via a variable low-pass filter 410, to a voltage controlled oscillator 412, which generates a frequency signal $f_{PLL}$. The signal $f_{PLL}$ for example has its frequency divided by an integer N by a frequency divider 414 in order to generate the feedback signal $f_{FB}$. As shown in FIG. 4, the signal $f_{PLL}$ may directly provide the frequency signal $f_{LORF}$ to the mixer 306. Alternatively, the signal $f_{PLL}$ may be divided by a further frequency divider (not illustrated in FIG. 4) to generate the signal $f_{LORF}$. The sampling signal $f_S$ is for example generated by dividing the signal $f_{PLL}$ by a variable integer M by a frequency divider 416. Thus both of the frequency signals $f_{LORF}$ and $f_s$ are for example generated using a common phase locked loop.

The integer N is for example variable in order to provide a coarse frequency selection. For example, in one embodiment, an incremental change in the integer N results in a shift BWch of the signal $f_{LORF}$ equal to the bandwidth of a sub-band, i.e. $2K\Delta f_{CH}$.

Figure 5A:
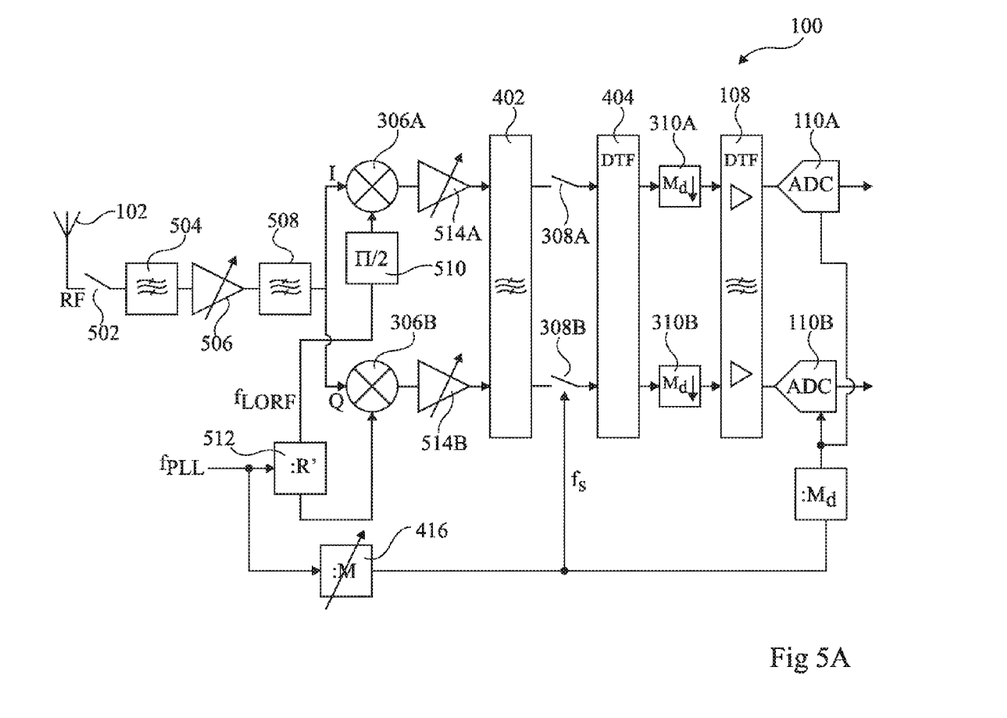
FIG. 5A schematically illustrates the RF receiver of FIG. 4 in yet more detail according to an example embodiment of the present disclosure.

FIG. 5A schematically illustrates parts of the RF receiver 100 of FIG. 4 in yet more detail. As illustrated in FIG. 5A, the series connection of a switch 502, a band pass filter 504, low noise amplifier (LNA) 506 and further band pass filter 508 are for example coupled between the antenna 102 and the mixer 306, and form a radio front end. The switch 502 for example permits the antenna 102 to be used by both a receiver 100, and by a transmitter (not illustrated in the figures). In some embodiments, the band pass filter 504 is an off-chip component having a pass-band of a bandwidth that is compatible with the sub-bands SB1, SB2, etc., and is typically equal to approximately 20 MHz. The mixer 306 comprises circuits 306A and 306B respectively receiving I and Q quadrature components of the RF signal. The circuit 306A mixes the I component with the frequency signal $f_{LORF}$ delayed by 90 degrees by a phase delay circuit 510. The circuit 306B mixes the Q component with the frequency signal $f_{LORF}$. In the example of FIG. 5A, the signal $f_{LORF}$ is generated by dividing the frequency of the signal $f_{PLL}$ by an integer R', which in some embodiments is set equal to 4. Such a frequency division is advantageous as it increases the operating frequency of the VCO, leading to a higher quality factor.

The output of the circuit 306A is for example provided to the band pass filter 402 via a variable gain amplifier 514A. Similarly, the output of the circuit 306B is for example provided to the band pass filter 402 via a variable gain amplifier 514B. The sampling circuit 308 for example comprises a sampling circuit 308A for sampling the I component signal, and a further sampling circuit 308B for sampling the Q component signal. Furthermore, the decimator 310 for example comprises a decimation circuit 310A receiving the I component signal, and a decimation circuit 310B receiving the Q component signal. The ADC 110 for example comprises an ADC 110A for performing digital conversion of the I component signal, and an ADC 110B for performing digital conversion of the Q component signal.

It will be noted that the analog to digital converter 110 runs at a frequency $f_{ADC}=f_s/M_d$, where $M_d$ is the decimation order applied by the decimator 310. In some embodiments, the central frequency $IF1_0$ of the DTF 404 is set to $f_s/4$.

An advantage of using a relatively high sampling frequency $f_s$ is that it relaxes the constraints on the image rejection performed by the RF filter 402. An advantage of using a relatively low sampling frequency $f_s$ is that it reduces the power consumption of the discrete time filters 404 and 108 and enables a lower decimation order $M_d$ to be applied by the decimator 310.

Furthermore, the frequency $IF2_0$ is equal to $IF1_0/M_d$, and thus by increasing $M_d$, the frequency $IF2_0$ can be reduced. In one embodiment, $M_d$ is an odd integer.

In one example, the above trade-offs lead to a central sampling frequency $f_{s0}$ being set to approximately 126 MHz, and the decimation order $M_d$ for example being set equal 7. Furthermore, the central frequency $IF1_0$ of the intermediate frequency band is for example selected to be approximately equal to 31.5 MHz, and thus the central ADC sampling frequency $f_{ADC0}$ is equal to $f_{s0}/M_d$=18 MHz. However, many other values would be possible.

The sampling frequency $f_s$ is for example generated by the same PLL as the one used for generating the signal $f_{LORF}$ such that only one frequency synthesis is performed. In one embodiment, $f_s=f_{PLL}/M$. The PLL for example runs at R' times the desired frequency, and thus $f_{LORF}=f_{PLL}/R'$.

The intermediate frequency band IF1 could be generated based on a local oscillator frequency $f_{LORFup}$ that is higher than the channel frequency $f_{RF}$, such that $IF1_{up}=f_{LORFup}-f_{RF}$, or based on a local oscillator frequency $f_{LORFdw}$ that is lower than the channel frequency $f_{RF}$, such that $IF1_{dw}=f_{RF}-f_{LORFdw}$. It follows that:

$$IF1_{dw}=f_{RF}-f_{PLL}/R'=f_{PLL}/4\cdot M \quad (1)$$

$$\Rightarrow f_{PLL}=(4\cdot R'\cdot M)f_{RF}/(4\cdot M+R') \quad (2)$$

$$\Rightarrow IF1_{dw}=R'\cdot f_{RF}/(4\cdot M+R') \quad (3)$$

$$\Rightarrow f_{LORFdw}=4\cdot M\cdot f_{RF}/(4\cdot M+R') \quad (4)$$

$$IF1_{up}=f_{PLL}/R'-f_{RF}=f_{PLL}/4\cdot M \quad (5)$$

$$\Rightarrow f_{PLL}=(4\cdot R'\cdot M)f_{RF}/(4\cdot M\cdot R') \quad (6)$$

$$\Rightarrow IF1_{up}=R'\cdot f_{RF}/(4\cdot M\cdot R') \quad (7)$$

$$\Rightarrow f_{LORFup}=4\cdot M\cdot f_{RF}/(4\cdot M\cdot R') \quad (8)$$

The central frequency $IF2_0$ of the lower frequency band IF2 is the result of the down-conversion resulting from the convolution product between the Lth harmonic of $f_{ADC}$ and the intermediate frequency band IF1. This $IF2_0$ can be expressed as follows:

$$IF2_0 = \min_L\left[\left(IF1 - \frac{L\cdot f_s}{M_d}\right)\right] = IF1 - \frac{2\cdot f_s}{7} = \frac{-f_s}{28} \quad (9)$$

The frequency of the signal $f_{PLL}$ generated by the phased locked loop has a finite step depending on the PLL division ratio N. The first down conversion provides an RF sub-band selection of K channels spaced by $\Delta f_{CH}$ and performs a coarse channel selection:

$$f_{PLL}=N\cdot R'\cdot 2K\cdot \Delta f_{CH} \quad (10)$$

In one example, the product $R'\cdot 2K\cdot \Delta f_{CH}$ is fixed at a value of approximately 4 MHz, implying that $2K\cdot \Delta f_{CH}$=1 MHz. In the case that K=50, this implies a channel spacing $\Delta f_{CH}$ of 10 KHz.

The value of the central frequency $f_{RF}$ of the selected sub-band of the RF input signal can be defined as follows based on the infradyne case of equation (4) above:

$$f_{RF}=N\cdot 2K\cdot \Delta f_{CH}\cdot (4\cdot M+R')/4\cdot M \quad (11)$$

where M and N are the integers of the PLL of FIG. 4. The range of M is for example as follows:

$$M = \frac{R'}{4}\left[\frac{f_{RF}}{IF1_{dw}} - 1\right], \text{ with } [\cdot] \text{ the integer part (round)} \quad (12)$$

$$M = \frac{R'}{4}\left[\frac{f_{RF}}{IF1_0} - 1\right], \text{ with } [\cdot] \text{ the integer part (round)} \quad (13)$$

The integer N is for example determined as:

$$N=[f_{RF}\cdot(4\cdot M/2K\cdot \Delta f_{CH}\cdot(4\cdot M+R')] \quad (14)$$

Figure 5B:
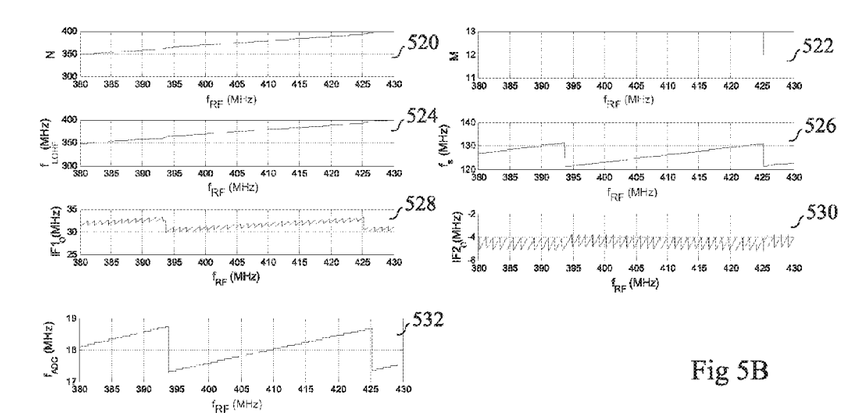
FIG. 5B illustrates graphs representing parameters in the receiver of FIG. 4 for a range of RF frequencies according to an example embodiment.

FIG. 5B shows:
a graph 520 providing example values of the integer N for a frequency range of 380 to 430 MHz;
a graph 522 providing example values of the integer M for the frequency range of 380 to 430 MHz;
a graph 524 providing example values of the frequency $f_{LORF}$ for the frequency range of 380 to 430 MHz;
a graph 526 providing example values of the sampling frequency $f_s$ for the frequency range of 380 to 430 MHz;
a graph 528 providing example values of the central frequency $IF1_0$ of the intermediate frequency band IF1 for the frequency range of 380 to 430 MHz;
a graph 530 providing example values of the central frequency $IF2_0$ of the lower frequency band IF2 for a frequency range of 380 to 430 MHz; and
a graph 532 providing example values of the operating frequency $f_{ADC}$ of the analog to digital converter 110A, 110B for a frequency range of 380 to 430 MHz.

Figure 6:
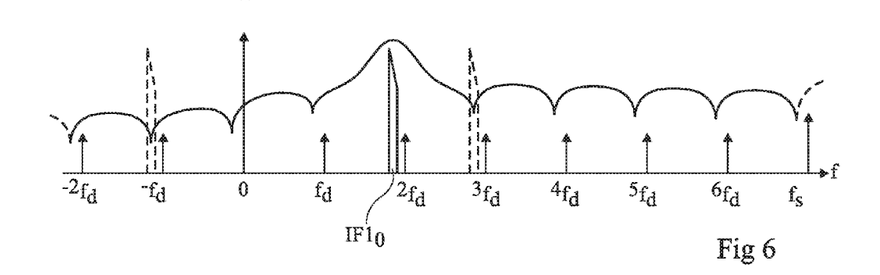
FIG. 6 is a spectral diagram illustrating an example of the transfer function of an anti-aliasing filter of FIGS. 4 and 5A.

FIG. 6 is a frequency diagram illustrating an example of the frequency response of the discrete time filter 404. This filter for example provides anti-aliasing rejection prior to decimation at multiples of the ADC frequency. For example, the rejection bands $BW_{rej-IF1}$ of this filter are located at $IF1_0+m\cdot f_d$, with m being positive and negative integers. In the example of FIG. 6, the order $M_d$ of the decimation operation is equal to 7. Thus the sampling frequency $f_s$ is divided into 7 frequency ranges each of width $f_d$, where $f_d=f_s/M_d$. More generally, an odd value of $M_d$ is for example chosen such that the frequency $IF2_0$ becomes equal to $\pm f_d/4$. Indeed, the frequency $IF2_0$ can be defined as follows:

$$IF2_0=\min_L L[(IF1_0-(L\cdot f_s)/M_d)]$$

Assuming that $IF1_0$ is equal to $f_s/4$, and that $M_d$ is odd and is thus equal to 2n+1, where n is an integer, it follows that:

$$IF2_0=f_s/4M_d*\min(2n+1-4L),$$

wherein L is an integer.

The minimum is when 2n=4L, and thus n=2L. In the case that n is even, n=2p, where p is an integer, and thus the minimum is when L=p. Thus $IF2_0=f_s/4M_d=f_d/4$. Alternatively, in the case that n is odd, n=2p+1, where p is an integer, and taking L=p+1, it follows that $IF2_0=f/4M_d*(2(2p+)+1-4p)$, and thus $IF2_0=-f_s/4M_d=-f_d/4$.

For example, the filter 404 applies the sinus cardinal function, which presents a notch at each one of the aliasing frequencies, and is thus particularly well adapted to such anti-aliasing purposes. The sinus cardinal function is for example implemented by an FIR (finite impulse response) filter. To further increase the filter selectivity and improve rejection, the FIR filter is for example combined with an IIR (infinite impulse response) filtering function.

Figure 7A:
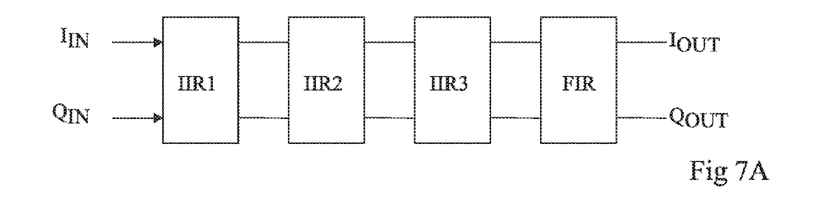
FIG. 7A schematically illustrates the anti-aliasing filter of FIGS. 4 and 5A in more detail according to an example embodiment.

FIG. 7A schematically illustrates an example embodiment of the discrete time filter 404, in which a plurality of IIR filter stages are cascaded, each IIR filter stage for example comprising one or more first order filters. The cascaded IIR filter stages are followed by an FIR stage. Such a solution has the advantage of limiting mismatch problems, by enabling a single capacitance ratio to be used long the stages of the filter. In the example of FIG. 7A, three IIR filters IIR1 to IIR3 are cascaded, but in alternative embodiments filter selectivity could be further increased by adding one or more further IIR filters, and/or by increasing the order of one or more of these filters or of the FIR filter.

Figure 7B:
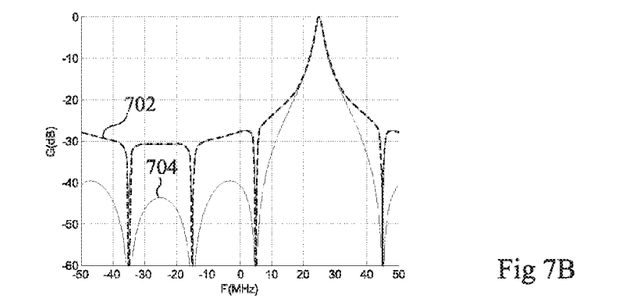
FIG. 7B is a filter frequency response diagram representing the response of FIR-IIR and IIR-FIR filters according to an example embodiment.

FIG. 7B is a filter frequency response diagram representing, by a dashed line 702, an example of the response of a different type of filter to the one of FIG. 7A formed by an FIR stage followed by an IIR stage, and by a solid line 704, an example of the response obtained by the filter of FIG. 7A. As illustrated, advantageously the use of an IIR filter followed by an FIR filter, in that order, provides a response particularly well adapted to the sliding IF architecture described herein. Indeed, the rejection bandwidth is high and thus provides good notch filtering over the full sliding IF band.

The low pass equivalent transfer function for P cascaded IIR stages and FIR stage of order $M_d$ is given as follows:

$$H(z) = \frac{(1-\beta)^P}{(1-\beta \cdot z^{-1})^P} \cdot \frac{1}{M_d} \sum_{m=0}^{M_d-1} z^{-m}$$

where β is a selectivity parameter.

In some embodiments, the filter is centered at $f_s/4$. The decimation order $M_d$ is an odd number, which means that in the decimation stage, the signal is again down-converted to a frequency which is equal to $IF2=f_s/4$. The frequency shift from 0 to $f_s/4$ is done by substitution on the z operator as follows:

$$z^{-m} \Rightarrow z^{-m} e^{j2\pi f_0/f_s}$$

where $f_0$ is the frequency shift. Therefore, in the case that $f_0=f_s/4$, $z^{-m} \Rightarrow z^{-m} j^m$. Thus in the case that the number P of IIR stages is equal to 3, the transfer function of the filter is for example:

$$Hc(z) = \frac{(1-\beta)^3}{(1-j\beta \cdot z^{-1})^3} \cdot \frac{1}{M_d} \sum_{m=0}^{M_d-1} z^{-m} j^m$$

Figure 8:
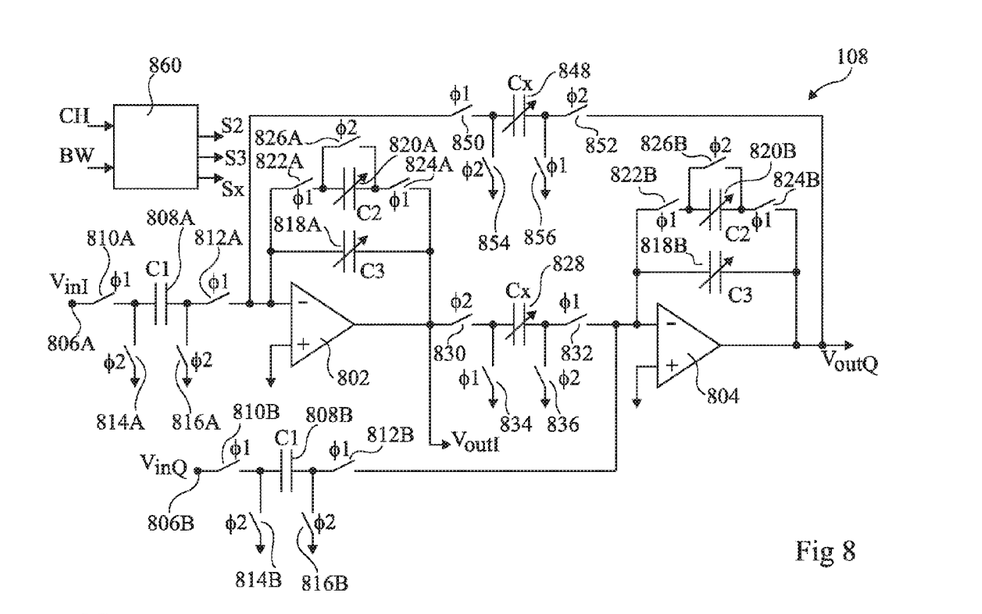
FIG. 8 schematically illustrates a variable discrete time band pass filter of FIG. 1 in more detail according to an example embodiment.

FIG. 8 schematically illustrates the discrete time filter 108 according to an example embodiment. This filter for example performs narrow band filtering in order to provide channel preselection among the 2K channels in a selected sub-band. Such a channel pre-selection is for example performed by shifting the transfer function of the filter such that the central frequency $f_0$ of the filter is over the desired channel. For example, in one embodiment, the central frequency $IF2_0$ of the lower frequency band IF2 is at approximately 4.5 MHz. For example, in the case that there are 100 channels in the selected frequency sub-band, and the channel spacing is equal to 10 KHz, the central frequency $f_0$ of the filter may slide by up to −/+0.5 MHz, in order to select a desired channel.

The DTF 108 for example comprises two operational trans-impedance amplifiers (OTAs) 802, 804. However, the circuit of FIG. 8 is merely one example of implementation, and it will be apparent to those skilled in the art how to adapt the circuit of FIG. 8 to implement a differential structure to provide improved dynamic range, or to implement a flip-flop structure so as to allow the clock frequency to be reduced and permit a connection to common mode to control the potential during the reset phase.

A negative input of the OTA 802 is coupled to an input 806A of the DTF 108 receiving the I component signal VinI via a capacitor 808A of capacitance C1. A switch 810A is coupled between the capacitor 808A and the input 806A, and a switch 812A is coupled between the capacitor 808A and the negative input of the OTA 802, the switches 810A, 812A being controlled by a phase signal φ1. Furthermore, switches 814A, 816A, controlled by a phase signal φ2, are coupled between the respective nodes of the capacitor 808A and ground. The negative input of the OTA 802 is also coupled to an output of the OTA 802 via a first branch comprising a capacitor 818A of variable capacitance C3, and via a second branch comprising a capacitor 820A of variable capacitance C2 and switches 822A, 824A respectively coupling the capacitor 820A to the negative input and output of the OTA 802, the switches 822A, 824A being controlled by the phase signal φ1. A switch 826A, controlled by the phase signal φ2, is for example coupled across the nodes of the capacitor 820A.

The output of the OTA 802 for example provides the output I component signal $V_{out}$ of the filter 108.

Similarly, a negative input of the OTA 804 is coupled to an input 806B of the DTF 108 receiving the Q component VinQ, via a capacitor 808B of capacitance C1. A switch 810B is coupled between the capacitor 808B and the input 806B, and a switch 812B is coupled between the capacitor 808B and the negative input of the OTA 802, the switches 810B, 812B being controlled by a phase signal φ1. Furthermore, switches 814B, 816B, controlled by a phase signal φ2, are coupled between the respective nodes of the capacitor 808B and ground. The negative input of the OTA 804 is also coupled to an output of the OTA 804 via a first branch comprising a capacitor 818B of variable capacitance C3, and via a second branch comprising a capacitor 820B of variable capacitance C2 and switches 822B, 824B respectively coupling the capacitor 820B to the negative input and output of the OTA 804, the switches 822B, 824B being controlled by the phase signal φ1. A switch 826B, controlled by the phase signal φ2, is for example coupled across the nodes of the capacitor 820B.

The output of the OTA 804 for example provides the output Q component signal $V_{outQ}$ of the filter 108.

The output of the OTA 802 is coupled to the negative input of the OTA 804 via a capacitor 828 of variable capacitance Cx and switches 830 and 832 respectively coupling the capacitor 828 to the output of the OTA 802 and to the negative input of the OTA 804, the switch 830 being controlled by the phase signal φ1 and the switch 832 being controlled by the phase signal φ2. Switches 834, 836, respectively controlled by the phase signals φ1 and φ2, are coupled between the respective nodes of the capacitor 828 and ground.

The negative input of the OTA 802 is coupled to the output of the OTA 804 via a capacitor 848 of variable capacitance Cx and switches 850 and 852 respectively coupling the capacitor 848 to the negative input of the OTA 802 and to the output of the OTA 804, the switch 850 being controlled by the phase signal φ1 and the switch 852 being controlled by the phase signal φ2. Switches 854, 856, respectively controlled by the phase signals φ2 and φ1, are coupled between the respective nodes of the capacitor 848 and ground.

In operation, the phase signals φ1 and φ2 are inserted in an alternate fashion. For example, the phase signal φ1 is asserted during odd periods of a clock signal, and brought low during the even periods of the clock signal, where the phase signal φ2 is asserted during the even periods of a clock signal, and brought low during the odd periods of the clock signal. The use of the two OTAs 802, 804 and the two phase signals φ1 and φ2 permits the frequency of operation of the filter 108 to be divided by two with respect to the nominal frequency of the sampling signal $f_s$.

The DTF 108 also for example comprises a control circuit 860 receiving signals CH and BW indicating a desired channel to be selected, and a desired bandwidth of the filter, and generating corresponding selection signals S1, S2, S3 and Sx for controlling the values of the respective variable capacitances C2, C3 and Cx. Indeed, in the example embodiment of FIG. 8, all of the capacitors are variable except C1. However, in alternative embodiments, the capacitor C1 could be variable and/or one or more of the other capacitors C2, C3 and Cx could be of fixed capacitance.

The complex transfer function of the filter, for a central frequency $f_0$, can be expressed in the following form:

$$H_C(z) = Gv \frac{(1-\beta)}{1-(\alpha+j\gamma)\cdot z^{-1}}$$

where α, β and γ are coefficients, and Gv is a voltage gain value. The coefficients α and γ can be expressed as:

$$\alpha = \beta \cdot \cos(2\pi f_0/f_d)$$

$$\gamma = \beta \cdot \sin(2\pi f_0/f_d)$$

where $f_d = f_s/M_d$, $M_d$ being the decimation order.

Figure 9:
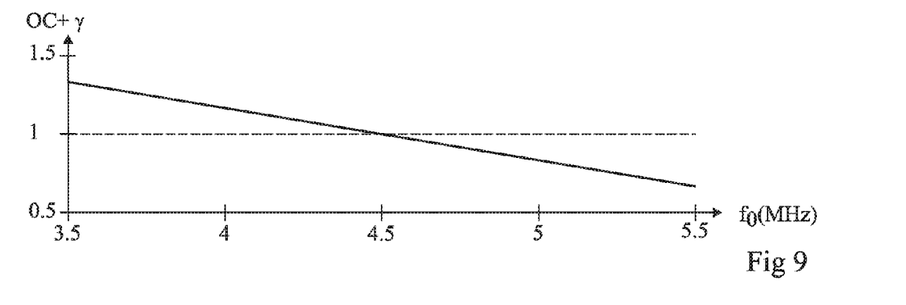
FIG. 9 is a graph representing frequency sliding of the variable discrete time band pass filter of FIG. 1 according to an example embodiment of the present disclosure.

In the circuit of FIG. 8, the central frequency $f_0$ of the filter slides around the nominal value IF$2_0$, centered at $f_d/4$. Thus $f_0$=IF$2_0 \pm \Delta$IF2, with IF$2_0$=$f_d/4$. Thus the sum α+γ can be expressed as follows:

$$\alpha + \gamma = \beta \cdot \left[ -\sin\left(2\pi \frac{\Delta IF2}{f_d}\right) + \cos\left(2\pi \frac{\Delta IF2}{f_d}\right) \right]$$

FIG. 9 is a graph representing the sliding frequency range of the central frequency $f_0$ as a function of the sum of the coefficients α+γ based on the above equation. It can be seen that the central frequency $f_0$ can be slid in the negative direction when the sum α+γ>1.

In the circuit of FIG. 8, the coefficients α, γ and $G_{vc}$ can be defined as follows, where $G_{vc}$=Gv(1−β) represents the input voltage gain per conversion during each clock period equal to:

$$\alpha = C3/(C2+C3)$$

$$\gamma = Cx/(C2+C3)$$

$$G_{vc} = C1/(C2+C3)$$

Furthermore, the sizes of the capacitances C2, C3 and Cx, and their ratios with respect to C1 can be defined as follows:

$$C3 = C1 \times \alpha/(1-\beta)G_v$$

$$Cx = C1 \times \gamma/(1-\beta)G_v$$

$$C2 = C1 \times (1-\alpha)/(1-\beta)G_v$$

Thus the value of C3, Cx and C2 can be set in order to achieve a desired central frequency $f_0$ of the filter 108, as determined by the sum of the coefficients α and γ, and a desired bandwidth of the filter 108, as determined by the value of β. It will be noted that C1 remains a degree of freedom. From this set of equations, it can be shown that the sum α+γ can be expressed as:

$$\alpha + \gamma = (C3+Cx)/(C2+C3)$$

Therefore, a negative sliding of the central frequency $f_0$ can be achieved by making Cx>C2.

In some embodiments, all of the capacitors C1, C2, C3 and Cx in FIG. 8 are equal to an integer multiple $n_i$ of a common capacitance unit Cu, where i={1, 2, 3, x}. This has the advantage that the filter coefficients become independent of analog dispersion, meaning that the circuit is robust against technological dispersion and temperature variations. The coefficients thus become:

$$\alpha = n_3/(n_2+n_3)$$

$$\gamma = n_x/(n_2+n_3)$$

$$G_{vc} = n_1/(n_2+n_3)$$

$$\alpha + \gamma = (n_3+n_x)/(n_2+n_3)$$

For example, for a voltage gain value Gv of 40, and for a common capacitance unit Cu of $2.2 \times 10^{-13}$ F, the following table provides examples of the integer multiples $n_i$ for each of the capacitances for central frequencies $f_0$ of 4.5 and 4 MHz, and for values of β of 0.967 ($\beta_{max}$ in the table) and of 0.9157 ($\beta_{min}$ in the table), which for example correspond respectively to bandwidths of 2*95 kHz and 2*255 kHz.

| | $f_0$ | $\beta_{max}$ | $\beta_{min}$ | $f_0$ + 1 MHz | $B_{max}$ | $\beta_{min}$ |
|---|---|---|---|---|---|---|
| $f_0$ | 4.5 MHz | 0.967 | 0.9157 | 4 MHz | 0.967 | 0.9157 |
| $n_{fb}$ | | 217 | 85 | | 217 | 85 |
| $n_3$ | | 0 | 0 | | 38 | 15 |
| $n_2$ | | 217 | 85 | | 180 | 70 |
| $N_x$ | | 210 | 78 | | 207 | 77 |
| $n_i$ | | 287 | 287 | | 287 | 287 |

Figure 10:
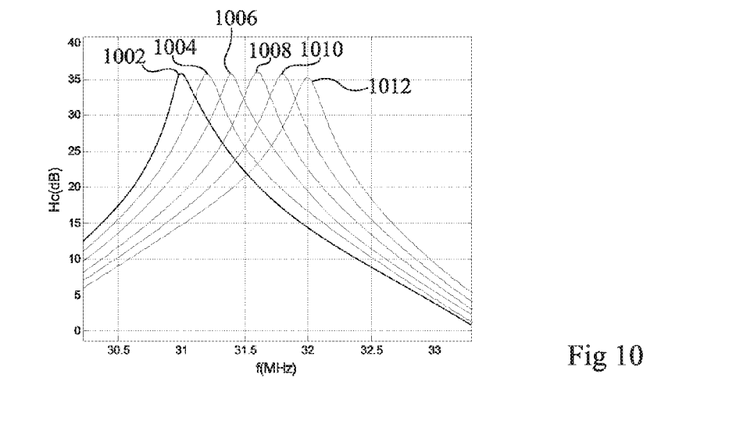
FIG. 10 is a graph representing an example of the transfer function of a decimation circuit and discrete time filter of FIG. 5A according to an example embodiment.

FIG. 10 is a graph representing an example of the overall transfer function Hc of the discrete time filter 404, the decimation circuit 310 and discrete time filter 108, based on the filter of FIG. 8, and assuming a sampling frequency $f_s$ of 126 MHz, an intermediate frequency IF$1_0$ of 31.5 MHz, a value of $M_d$ of 7, and a selective bandwidth at IF$2_0$ of 95 kHz. As illustrated by the six curves labelled 1002, 1004, 1006, 1008, 1010 and 1012, the pass band can be slid by increments of approximately 200 kHz in the range 31 MHz to 32 MHz. The present inventors have found that the quality factor $Q_{IF2}$ is equal to 23.7, and the equivalent overall quality factor at IF$1_0$ is $Q_{\{IF1-IF2\}}$=166. This high quality factor is particularly remarkable in view of the integration constraints at the frequency of 31.5 MHz.

An advantage of performing sampling and discrete time processing is that chip area is economised when compared to a continuous time solution.

An advantage of using a switched capacitor filter to implement the variable band pass filter 108 is that this provides a transfer function which is robust to technological variations because it only depends on capacitance ratios.

An advantage of performing decimation prior to the discrete time processing is that this permits to further reduce the frequency of operation of the variable band pass filter 108 and thereby reduce power consumption.

Having thus described at least one illustrative embodiment, various alterations, modifications and improvements will readily occur to those skilled in the art.

For example, it will be apparent to those skilled in the art that while an example has been described in which the frequency signal generation circuit 106 comprises a phase locked loop, it would be possible to use other types of circuits to generate the frequency signals $f_{LORF}$ and $f_s$.

Furthermore, it will be apparent to those skilled in the art that the various features described in relation to the various embodiments could be combined, in alternative embodiments, in any combination.

What is claimed is:

1. An RF receiver comprising:
a down-converting and sampling circuit adapted to:
receive an RF input signal having a signal band comprising a plurality of sub-bands, each sub-band comprising a plurality of channels separated by frequency channel spaces;
perform frequency transposition and sampling at a sampling frequency to generate a discrete time signal in which a selected one of the plurality of sub-bands is brought from an initial frequency band to a lower frequency band centered on a first central frequency, wherein the first central frequency of the lower frequency band remains the same irrespective of which of the plurality of sub-bands is selected, the lower frequency band having a bandwidth equal to at least the sum of the channel spaces of a sub-band, and the sampling frequency remaining at a same level for all channels of each selected sub-band; and
a discrete time filter receiving the discrete time signal and having a variable pass band and a variable central frequency controllable to correspond to a second central frequency, different than the first central frequency of the lower frequency band, of a channel to be selected among the plurality of channels of the selected sub-band in order to select any one of said plurality of channels.

2. The RF receiver of claim 1, wherein the discrete time filter is controllable to select a first channel of the selected sub-band by bringing the central frequency of the discrete time filter to a frequency of the first channel.

3. The RF receiver of claim 1, wherein the down-converting and sampling circuit comprises:
a first transposition circuit adapted to transpose the selected sub-band from the initial frequency band to an intermediate frequency band based on a first frequency signal;
a frequency signal generation circuit adapted to generate the first frequency signal based on an initial frequency signal generated as a function of the sub-band to be selected; and
a second transposition circuit adapted to transpose the selected sub-band from the intermediate frequency band to the lower frequency band.

4. The RF receiver of claim 3, wherein:
the first transposition circuit comprises a mixer adapted to mix the RF input signal with the first frequency signal to generate an intermediate signal;
the down-converting and sampling circuit comprises a sampling circuit driven by a second frequency signal to sample the intermediate signal and to generate an intermediate discrete time signal; and
the second frequency signal is generated by the frequency signal generation circuit based on the initial frequency signal.

5. The RF receiver of claim 4, wherein the frequency signal generation circuit is adapted to generate the second frequency signal by dividing the initial frequency signal by an integer.

6. The RF receiver of claim 4, wherein the second transposition circuit comprises:
a decimator adapted to decimate the signal at the central frequency of the intermediate frequency band and transpose the intermediate frequency band to the lower frequency band), wherein decimation decreases the sampling rate to $f_d = f_s/M_d$, where $f_s$ is the frequency of the second frequency signal, and $M_d$ is the decimation order of the decimator equal to an odd integer of 3 or more; and
an anti-aliasing filter adapted to perform anti-aliasing filtering prior to the decimation, wherein the anti-aliasing filter is adapted to have a pass band of a bandwidth equal to or greater than the combined bandwidth of the plurality of channels.

7. The RF receiver of claim 6, wherein the anti-aliasing filter comprises:
an IIR filter stage adapted to receive the selected sub-band at the intermediate frequency band; and
an FIR filter coupled to an output of the IIR filter.

8. The RF receiver of claim 6, wherein the anti-aliasing filter is configured to have:
a central frequency at $f_s/4$, where fs is the frequency of the second frequency signal;
a pass bandwidth equal to or greater than the bandwidth of the selected sub-band; and
rejection band characteristics rejecting the signal at $IF1_0 + m^*f_d$, where $IF1_0$ is the central frequency of the anti-aliasing filter, m is an integer equal or greater than 1, and $f_d$ is equal to the frequency $f_s/M_d$.

9. The RF receiver of claim 3, wherein the frequency signal generation circuit comprises a phase locked loop having a feedback path comprising a division circuit adapted to divide the initial frequency signal by an integer N, wherein the value of N is adjusted based on the sub-band to be selected.

10. The RF receiver of claim 1, wherein the discrete time filter comprises a plurality of switched capacitors of which at least one has a capacitance variable in order to select one of the plurality of channels of the selected sub-band.

11. The RF receiver of claim 10, wherein the discrete time filter is adapted to have a passband bandwidth variable between a plurality of values, the plurality of switched capacitors further comprises at least one capacitor adapted to have a variable capacitance for selecting one of the plurality of passband bandwidths.

12. The RF receiver of claim 10, wherein the discrete time filter comprises:
a first operational trans-impedance amplifier having a first input coupled via a first switched capacitor to a first input for receiving a first signal component from the down-converting and sampling circuit, and
a second operational trans-impedance amplifier having a second input coupled via a second switched capacitor to a second input for receiving a second signal component from the down-converting and sampling circuit.

13. The RF receiver of claim 12, wherein the discrete time filter (108) further comprises:
a third capacitor coupled between the input and an output of the first operational trans-impedance amplifier;
a fourth switched capacitor coupled between the input and the output of the first operational trans-impedance amplifier;

a fifth capacitor coupled between the input and an output of the second operational trans-impedance amplifier
a sixth switched capacitor coupled between the input and the output of the second operational trans-impedance amplifier;
a seventh switched capacitor coupled between the input of the first operational trans-impedance amplifier and the output of the second operational trans-impedance amplifier;
an eighth switched capacitor coupled between the output of first operational trans-impedance amplifier and the input of the second operational trans-impedance amplifier; and
a control circuit for generating selection signals for controlling the capacitance of at least one of the second, third, fourth, fifth, sixth, seventh and eighth capacitors based on the channel to be selected.

14. An RF receiver comprising:
a down-converting and sampling circuit adapted to:
   receive an RF input signal having a signal band comprising a plurality of sub-bands, each sub-band comprising a plurality of channels separated by frequency channel spaces;
   perform frequency transposition and sampling to generate a discrete time signal in which a selected one of the plurality of sub-bands is brought from an initial frequency band to a lower frequency band; and
a discrete time filter having a variable pass band, the central frequency of the discrete time filter being controllable to select any one of the plurality of channels of the selected sub-band, wherein the discrete time filter is an IIR discrete time processing filter having a transfer function Hc(z) based on the equation:

$$H_C(z) = Gv \frac{(1-\beta)}{1-(\alpha+j\gamma) \cdot z^{-1}}$$

where Gv is a voltage gain of the filter, and $\alpha$, $\beta$ and $\gamma$ are coefficients, and wherein the coefficients $\alpha$ and $\gamma$ are variable and selected such that $\alpha+\gamma>1$.

15. The RF receiver of claim 14, wherein the coefficient $\beta$ is adjustable in order to control the bandwidth of the discrete time filter.

16. A method of RF reception comprising:
receiving by an RF receiver an RF input signal having a signal band comprising a plurality of sub-bands, each sub-band comprising a plurality of channels separated by frequency channel spaces;
performing frequency transposition and sampling at a sampling frequency to generate a discrete time signal in which a selected one of the plurality of sub-bands is brought from an initial frequency band to a lower frequency band centered on a first central frequency, wherein the first central frequency of the lower frequency band remains the same irrespective of which of the plurality of sub-bands is selected, the lower frequency band having a bandwidth equal to at least the sum of the channel spaces of a sub-band, and the sampling frequency remaining at a same level for all channels of each selected sub-band;
receiving the discrete time signal by a discrete time filter having a variable pass band and a variable central frequency controllable to correspond to a second central frequency, different than the first central frequency of the lower frequency band, of a channel to be selected among the plurality of channels of the selected sub-band; and
controlling the variable central frequency of the discrete time filter to select any one of the plurality of channels of the selected sub-band.

\* \* \* \* \*